United States Patent [19]

Magdics et al.

[11] Patent Number: 4,956,154
[45] Date of Patent: Sep. 11, 1990

[54] SELECTIVE REMOVAL OF CHROMIUM, NICKEL, COBALT, COPPER AND LEAD CATIONS FROM AQUEOUS EFFLUENT SOLUTIONS

[75] Inventors: Alex Magdics; Donald B. Stain, both of Lakeland, Fla.

[73] Assignee: UNC Reclamation, Mulberry, Fla.

[21] Appl. No.: 166,079

[22] Filed: Mar. 9, 1988

[51] Int. Cl.$^5$ .................. C01G 31/14; B01D 11/04

[52] U.S. Cl. .................................. 423/54; 423/24; 423/27; 423/32; 423/34; 423/36; 423/38; 423/42; 423/45; 423/46; 423/56; 423/57; 423/92; 423/98; 423/139; 423/140; 423/146; 423/150; 423/DIG. 14; 210/660; 210/634; 502/11

[58] Field of Search .............. 423/24, 34, 32, 27, 423/36, 38, 42, 45, 46, 54, 56, 57, 92, 98, 139, 140, 146, 150, DIG. 14; 210/660, 634, 638; 502/11

[56] References Cited

U.S. PATENT DOCUMENTS

| | | | |
|---|---|---|---|
| 3,894,139 | 7/1975 | Cardwell et al. | 423/24 |
| 3,931,196 | 1/1976 | Swan | 260/293.62 |
| 3,950,488 | 4/1976 | Skarbo et al. | 423/24 |
| 3,960,762 | 6/1976 | Kroebel et al. | 252/426 |
| 3,966,569 | 6/1976 | Reinhardt et al. | 423/24 |
| 3,966,659 | 6/1976 | Oxe et al. | 260/29.6 |
| 4,029,734 | 6/1977 | Stauter et al. | 423/57 |
| 4,051,230 | 9/1977 | Miyauchi | 423/658.5 |
| 4,058,585 | 11/1977 | MacKay et al. | 423/24 |
| 4,150,092 | 4/1979 | Pitts | 423/63 |
| 4,162,294 | 7/1979 | Witzke et al. | 423/24 |
| 4,173,520 | 11/1979 | Demarthe et al. | 423/40 |
| 4,186,174 | 1/1980 | Hunter et al. | 423/54 |
| 4,196,076 | 4/1980 | Fujimoto et al. | 210/21 |
| 4,236,981 | 12/1980 | Demarthe et al. | 423/140 |
| 4,242,127 | 12/1980 | Müller et al. | 423/24 |
| 4,268,395 | 5/1981 | Stewart | 210/634 |
| 4,278,640 | 7/1981 | Allen et al. | 423/24 |
| 4,283,224 | 8/1981 | Stewart | 423/22 |
| 4,324,768 | 4/1982 | Sugahara et al. | 423/92 |
| 4,336,236 | 6/1982 | Kolakowski et al. | 423/92 |
| 4,344,924 | 8/1982 | Lucas et al. | 423/54 |
| 4,348,367 | 9/1982 | Rickelton et al. | 423/139 |
| 4,353,883 | 10/1982 | Rickelton et al. | 423/139 |
| 4,374,780 | 2/1983 | Robertson | 260/502.4 |
| 4,382,016 | 5/1983 | Rickelton et al. | 252/428 |
| 4,442,073 | 4/1984 | Robinson et al. | 423/54 |
| 4,528,167 | 7/1985 | Preston | 423/139 |
| 4,559,203 | 12/1985 | Bauer et al. | 423/112 |
| 4,610,861 | 9/1986 | Babjak | 423/157 |
| 4,619,816 | 10/1986 | Rickelton | 423/139 |
| 4,647,438 | 3/1987 | Sabot et al. | 423/21.5 |
| 4,670,230 | 6/1987 | Wantanabe et al. | 423/109 |
| 4,702,838 | 10/1987 | Babcock et al. | 423/24 |
| 4,721,605 | 1/1988 | Brown et al. | 423/100 |

FOREIGN PATENT DOCUMENTS

| | | |
|---|---|---|
| 1170839 | 7/1984 | Canada . |
| 2249838 | 5/1975 | France . |
| 2334634 | 7/1977 | France . |
| 2483464 | 12/1981 | France . |
| 67409 | 10/1973 | Luxembourg . |
| 960545 | 6/1964 | United Kingdom . |
| 1395286 | 5/1975 | United Kingdom . |
| 1486322 | 9/1977 | United Kingdom . |
| 1529030 | 10/1978 | United Kingdom . |

OTHER PUBLICATIONS

M. Dejak et al, "Copper, Nickel, and Chrome Recovery in a Jobshop to Eliminate Waste Treatment and Sludge Disposal", Hazardous Waste & Hazardous Materials, vol. 4, No. 3, 1987.
Cyanex 272 Extractant.
G. Kordosky, "The Chemistry of Metals Recovery Using LIX Reagents", Henkel Corporation, 1987.
Hydrometallurgy, vol. 14, No. 3, Aug. 1985, pp. 387–393.

Primary Examiner—Robert L. Stoll
Assistant Examiner—Paige C. Harvey
Attorney, Agent, or Firm—Fleit, Jacobson, Cohn, Price, Holman & Stern

[57] ABSTRACT

Aqueous effluent solutions containing metal cations may be treated with an extractant comprising an organophosphinic acid, a di-2-ethylhexyl phosphoric acid and/or an aliphatic amine to selectively separate chromium, nickel, cobalt, copper and lead cations from the aqueous solution. Typical extraction techniques include liquid-liquid extraction employing either mixer settlers or columns, liquid membrane extraction and selective supported membrane extraction.

10 Claims, 1 Drawing Sheet

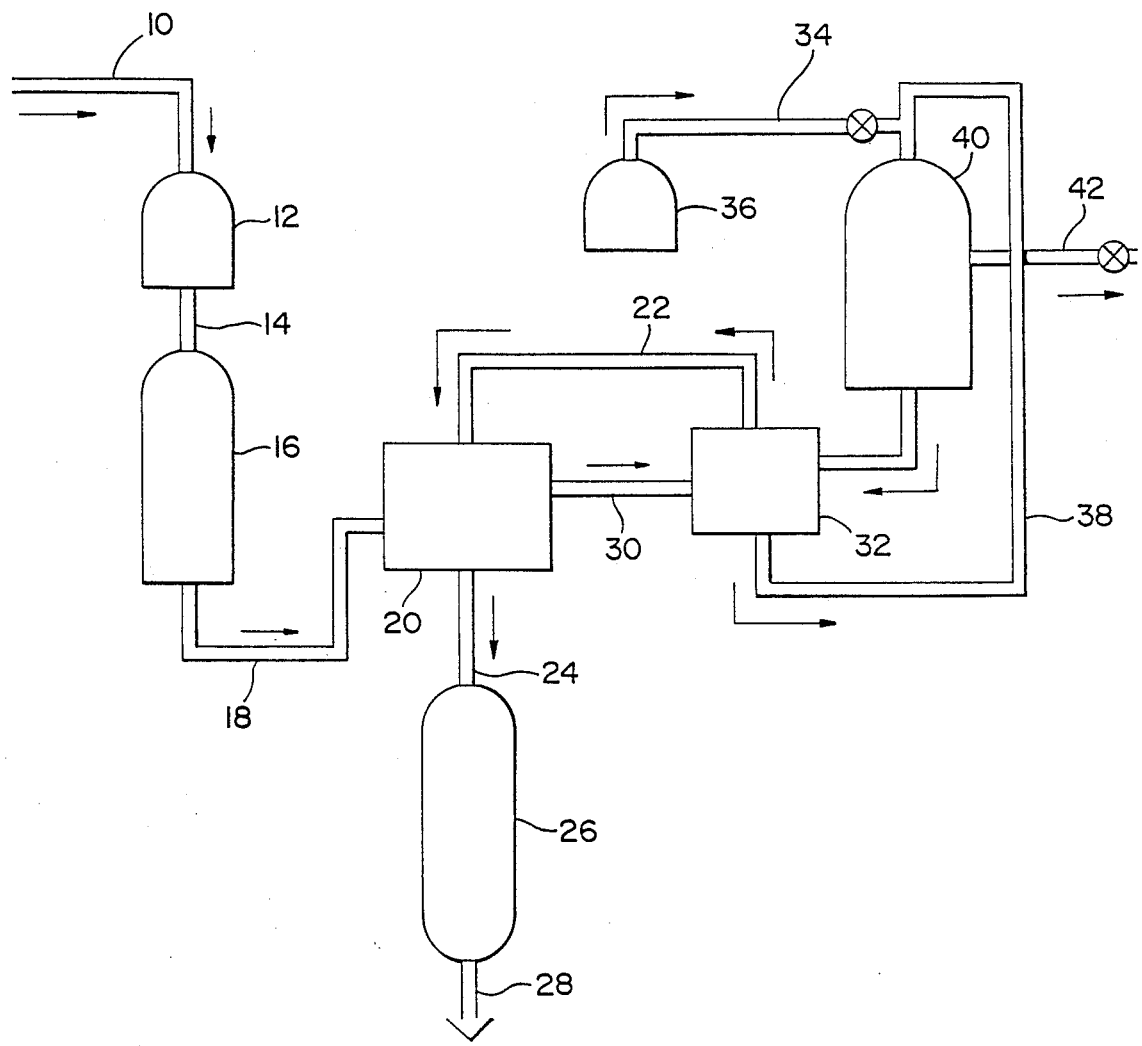

SELECTIVE REMOVAL OF CHROMIUM, NICKEL, COBALT, COPPER AND LEAD CATIONS FROM AQUEOUS EFFLUENT SOLUTIONS

BACKGROUND OF THE INVENTION

The present invention relates to the recovery of metal cations from aqueous effluent solutions, especially aqueous effluent solutions from metal finishing plants, by solvent extraction and stripping techniques.

The removal of copper, nickel and chromium from the aqueous effluent of a metal finishing plant is known. In a typical known system, the metals are recovered by short bed ion exchange. Periodically, the ion exchangers are regenerated to yield a concentrated metal salt solution which is recycled to the appropriate plating bath. "Copper, Nickel, and Chrome Recovery in a Jobshop to Eliminate Waste Treatment and Sludge Disposal", Michael Dejak et al, *Hazardous Waste & Hazardous Materials*, Vol. 4, No. 3, 1987. See U.S. Pat. No. 4,186,174.

There is still a need, however, for other methods of removing metal cations from metal finishing plant effluent which are efficient and cost-effective.

SUMMARY OF THE INVENTION

The present invention provides a process for the selective removal of metal cations (e.g., chromium, nickel, cobalt, copper and lead cations) from aqueous effluent solutions, especially aqueous effluent solutions from metal finishing plants, by solvent extraction and stripping techniques. The extractant comprises an organophosphinic acid, a di-2-ethylhexyl phosphoric acid and/or an aliphatic amine.

BRIEF DESCRIPTION OF THE DRAWING

The figure is a process flow diagram of a basic extraction and stripping operation in accordance with the invention.

DETAILED DESCRIPTION OF THE INVENTION

In carrying out the present invention, extraction techniques compatible with an extractant comprising an organophosphinic acid, a di-2-ethylhexyl phosphoric acid and/or an aliphatic amine are employed and include, but are not limited to, liquid-liquid extraction employing either mixer-settlers or columns, such as pulse columns, liquid membrane extraction and selective supported membrane extraction.

An organic-soluble phosphinic acid or salt thereof extractant may be used in the extraction of metal cations. The free phosphinic acids and their alkali metal or ammonium salts are preferred, but other salts may be employed. Although pure extractant can be used, it is generally preferred to employ a diluent comprising from about 2 to 99 parts by volume of extractant with from about 98 to 1 parts by volume of a water-immiscible organic diluent, preferably from about 2 to 70 parts by volume of the extractant with from about 98 to 30 parts by volume of diluent. The diluent may optionally contain from about 1 to 15 parts by volume of a phase modifier to promote the separation of the phases and/or increase the solubility of the extracted metal cation in the organic phase. If a phase modifier is employed, the amount of organic diluent used should be reduced by a corresponding amount.

Generally, a wide variety of water-immiscible organic liquids may be used as the diluent. Suitable diluents include, but are not limited to, carbon tetrachloride, toluene, xylene, kerosene, naphtha, tridecanol, methylisobutylketone, tributylphosphate, cyclohexane, decane, pyridine, dibromoethane, and the like. Preferably, the diluent is an aliphatic or aromatic petroleum distillate. Suitable phase modifiers, when employed, include: tributylphosphate, trimethylphosphine oxide, tributylphosphine oxide, trihexyl phosphine oxide, triootylphosphine oxide, isodecanol, and the like. The preferred process employs bis(2,4,4-trimethylpentyl) phosphinic acid (e.g., American Cyanamid Company, CYANEX 272) which is totally miscible with common aromatic and aliphatic diluents.

The organic-soluble phosphinic acid or salt thereof is generally represented by the following structure:

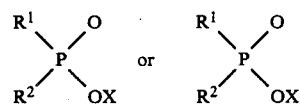

wherein $R_1$ and $R_2$ are individually substituted or unsubstituted alkyl, cycloalkyl, alkoxyalkyl, alkylcyclo alkyl, aryl, alkylaryl, aralkyl or cycloalkylaryl radicals and X is either hydrogen or a salt-forming radical. Preferably, the organic-soluble phosphinic acid is bis(2,4,4-trimethylpentyl) phosphinic acid. Typical other organophosphinic acids which may be employed are listed in U.S. Pat. No. 4,348,367.

In carrying out the process of the present invention, the aqueous solution is contacted either by batch, co-current or counter-current contact, with the organic phosphinic extractant. The aqueous solution should have a pH of at least 3 depending on the metal to be removed. It is preferred that the aqueous solution have a pH of about 4 to 8. Aqueous to organic ratios of from about 1:20 to 20:1 are believed to be effective. Phase contact is suitably achieved in "mixer-settlers", although many other types of devices are also suitable. In the mixer, one phase is dispersed within the other by stirring or some other appropriate form of agitation. The extractant then forms a complex with the metal(s) in the organic phase of the two-phase liquid mixture. The dispersion then flows to the settler where phase disengagement occurs under quiescent conditions. Generally, extraction is carried out between about 0–80 degrees C., preferably about 20–70 degrees C.

The pregnant extractant is stripped by contacting it with a solution of a mineral acid at about 0–80 degrees C., preferably about 20–60 degrees C., at a pH of approximately 0.5 to 6. The mineral acid preferably has a concentration of about 0.001 to 250 g/l. Aqueous to organic ratios of about 0.1 to 1.0 are suitable. As a result, the metal cation forms a soluble salt of the mineral acid employed. Phase contact may be achieved with mixer-settlers, or other suitable devices. Suitable mineral acids include sulfuric, hydrochloric, hydrofluoric, nitric, and the like.

The stripped extractant is recycled to the contactor for treatment of incoming aqueous solution. The extractant may be recycled to the contactor in the form of the free phosphinic acid. In this case, pH control by the addition of a base is required in the contactor. Alternatively, the recycled solvent may be pretreated and converted to the alkali metal or ammonium salt form before returning to the contactor. In the latter case, pH control is not required.

Depending on the metal cation to be extracted, the extractant may also be di-2-ethylhexyl phosphoric acid ("DEPA") or salt thereof. Although pure extractant can be used, it is generally preferred to employ a diluent comprising from about 1 to 40 parts by volume of extractant with from about 60 to 99 parts by volume of a water-immiscible organic diluent, preferably from about 5 to 10 parts by volume of the extractant with from about 90 to 95 parts by volume of the diluent. The diluent may be aliphatic or aromatic and the same type of diluent may be employed as with the organophosphinic acid extractant. The extractant solution preferably contains a modifier such as discussed herein with respect to the organophosphinic acid extractant.

In carrying out the process of the present invention, the aqueous solution is contacted with the DEPA as discussed herein with respect to the organophosphinic acid extractant. The aqueous solution should have a pH of at least 2 depending on the metal cation to be recovered. It is preferred that the aqueous solution have a pH of about 2 to 5. Aqueous to organic ratios of from about 0.1 to 20 are believed to be effective. Phase contact is achieved in "mixture-settlers" and the like as discussed herein with respect to the organophosphinic acid extractant. Generally, extraction is carried out between about 10 to 70 degrees C., preferably about 15 to 30 degrees C.

The pregnant extractant is stripped by contacting it with a mineral acid at about 20 to 80 degrees C., preferably about 30 to 50 degrees C., at a pH of approximately 0.5 to 5. The mineral acid preferably has a concentration of about 0.001 to 250 g/l. Aqueous to organic ratios of about 0.1 to 10 are suitable. As a result, the metal anion forms a soluble salt of the mineral acid employed. Phase contact may be achieved with mixer-settlers, or other suitable devices. Suitable mineral acids are those discussed herein for stripping the organophosphinic acid extractant.

The stripped extractant is recycled to the contactor for treatment of incoming aqueous solutions. The extractant may be recycled to the contactor in the form of free DEPA or converted to the salt form before returning to the contactor.

Depending on the metal cation to be extracted, the extractant also may be an aliphatic amine, preferably an aliphatic quaternary amine. Although pure extractant can be used, it is generally preferred to employ a diluent comprising from about 1 to 40 parts by volume of extractant with from about 60 to 99 parts by volume of a water-immiscible organic diluent, preferably from about 5 to 10 parts by volume of the extractant with from about 90 to 95 parts by volume of the diluent. The diluent may be aliphatic or aromatic and the same type of diluent may be employed as with the organophosphinic acid extractant.

The aliphatic amine may be a primary, secondary or tertiary amine. The aliphatic portion of the amine extractant is preferably alkyl such as octyl or decyl. Preferably, the aliphatic amine is triootyl methyl ammonium hydroxide. A typical other aliphatic amines which may be employed is tridecyl methyl ammonium hydroxide.

In carrying out the process of the present invention, the aqueous solution is contacted with the aliphatic amine as discussed herein with respect to the organophosphinic acid extractant. The aqueous solution should have a pH of at least 2 depending on the acidic anion to be recovered. It is preferred that the aqueous solution have a pH of about 3 to 8. Aqueous to organic ratios of from about 0.1 to 10 are believed to be effective. Phase contact is achieved in "mixture-settlers" and the like as discussed herein with respect to the organophosphinic acid extractant. Generally, extraction is carried out between about 20 to 45 degrees C., preferably 25 to 35 degrees C.

The pregnant extractant is stripped by contacting it with a solution of an alkali metal or ammonium salt at about 45 to 80 degrees C., preferably about 35 to 65 degrees C., at a pH of approximately 8 to 10. The alkali metal or ammonium salt preferably has a concentration of about 50 to 150 g/l. Aqueous to organic ratios of about 0.1 to 10 are suitable. As a result, the acidic anion forms a soluble salt of the alkali metal or ammonium salt employed. Phase contact may be achieved with mixer-settlers, or other suitable devices. The preferred alkali metal or ammonium salt is ammonium hydroxide. The stripped extractant is recycled to the contactor for treatment of incoming aqueous solution.

The process of the present invention is used to treat effluent from metal finishing plants and the like to yield water containing less than about 1 ppm of dissolved metal anions. A typical metal finishing plant is a printed circuit board manufacturing plant which requires electroplating, etching, and cleaning processes that generate metal-bearing rinse water. Metal concentrations are typically between about 1 and 200 ppm, more typically between about 1 and 30 ppm.

Electrolytes in aqueous solution dissociate, to a greater or lesser degree, into anions and cations. Typical effluent from a metal finishing plant contains one or more of the following electrolytes and resulting cations and anions:

|  | Cation | Anion |
|---|---|---|
| Sulphuric acid $H_2SO_4$ | $2H++$ | $SO_4--$ |
| Nickel Sulphate $NiSO_4$ | $Ni++$ | $SO_4--$ |
| Copper Sulphate $CuSO_4$ | $Cu++$ | $SO_4--$ |
| Lead Sulfate $PbSO_4$ | $Pb++$ | $SO_4--$ |
| Cobalt Sulfate $CoSO_4$ | $Co++$ | $SO_4--$ |
| Divalent Chromous Sulphate $CrSO_4$ | $Cr++$ | $SO_4--$ |
| Trivalent Chromic Sulphate $Cr_2(SO_4)_3$ | $2Cr+++$ | $3SO_4--$ |
| Hexavalent Chromic Acid $H_2CrO_4$ | $2H++$ | $CrO_4--$ |

To provide a better understanding of the process of the present invention, the process will be described in general with reference to the accompanying figure. Rinse water from the plating solution in the metal finishing plant is fed via line 10 to filter 12. Filter 12 is a cartridge-type filter which can remove particles down to 10 microns. From filter 12, the rinse water flows via line 14 to carbon tower 16. Carbon tower 16 is a conventional carbon filter for removing organics and the like. After passing through carbon tower 16, the rinse water passes via line 18 to contactor 20. Contactor 20 is a mixer-settler or other contactor is described herein. In contactor 20, the rinse water is contacted with barren extractant recycled to contactor 20 via line 22. After separation, the aqueous phase is fed via line 24 through carbon tower 26 to remove any residual organics and is then recycled to the plating operation or discharge from the metal finishing plant via line 28. After phase separation, the pregnant extractant is fed via line 30 to stripping unit 32 which may be a mixer-settler or the like. In stripping unit 32, the pregnant extractant is contacted with a stripping solution fed to stripping unit 32 via line 34 from stripping solution tank 36. The stripping solution may be, for example, sulfuric acid in the case of an organophosphinic acid extractant or a DEPA extractant, or ammonium hydroxide in the case of an aliphatic amine extractant. After phase separation, the barren extractant is recycled to contactor 20 via line 22 and the metal anion concentrate solution is removed from the stripping unit 32 via line 38. If the metal concentrate solution is to be treated in a remote refinery, it may be stored in storage tank 40 and removed from the metal TM for further treatment at a remote finishing plant via line 42 for the treatment at a remote location. It will be understood that the process flow diagram of the accompanying figure will be modified as required to accommodate additional extraction, stripping, scrubbing and re-extraction steps as will be discussed herein.

Chromium Recovery

An aliphatic amine extractant such as trioctyl methyl ammonium hydroxide ($R_4NOH$) dissolved in kerosene is used to clean up an aqueous solution containing traces of sulfuric acid and chromic acid. The aqueous solution at pH of about 2 to 8, preferably at pH of about 6 to 8, is first extracted with $R_4NOH$.

| A. Extraction | | |
| --- | --- | --- |
| | Aqueous Phase | Extractant Phase |
| In | $H_2SO_4+H_2CrO_4+H_2O$ | $R_4NOH$ |
| Out | $H_2O$ | $(R_4N)_2CrO_4$ |
| | | $(R_4N)_2SO_4$ |

The pregnant extractant is then stripped with ammonium hydroxide ($NH_4OH$).

| B. Strip | | |
| --- | --- | --- |
| | Aqueous Phase | Extractant Phase |
| In | $NH_4OH+H_2O$ | $(R_4N)_2CrO_4$ |
| | | $(R_4N)_2SO_4$ |
| Out | $H_2O+(NH_4)_2CrO_4+(NH_4)_2SO_4$ | $R_4NOH$ |

The barren extractant ($R_4NOH$) is recycled to the extraction stage and the aqueous strip solution shipped to a remote refinery. The chromic cation is recovered at the remote refinery by re-extracting the aqueous strip solution at pH of about 2 to 8, preferably at pH of about 6 to 8, with an aliphatic amine.

| C. Re-extraction | | |
| --- | --- | --- |
| | Aqueous Phase | Extractant Phase |
| In | $H_2O+(NH_4)_2CrO_4+(NH_4)_2SO_4+H_2SO_4$ | $R_4NOH$ |
| Out | $H_2O+(NH_4)_2SO_4$ | $(R_4N)_2CrO_4$ |

The aqueous phase is disposed of to the fertilizer industry, for example, and the pregnant extractant stripped with ammonium hydroxide.

| D. Strip | | |
| --- | --- | --- |
| | Aqueous Phase | Extractant Phase |
| In | $NH_4OH+H_2O$ | $(R_4N)_2CrO_4$ |
| Out | $(NH_4)_2CrO_4+H_2O$ | $R_4NOH$ |

The barren extractant ($R_4NOH$) is recycled to the reextraction stage, and the chromium is recovered from the $(NH_4)_2CrO_4$ by crystallization.

Selective Recovery of Chromium, Cobalt and Nickel

An aqueous solution containing traces of chromic acid, nickel sulphate and cobalt sulphate having a pH of about 2 to 8, preferably a pH of about 6 to 8, is extracted with an aliphatic amine ($R_4NOH$) as in "Chromium Recovery".

| A. First Extraction | | |
| --- | --- | --- |
| | Aqueous Phase | Extractant Phase |
| In | $H_2CrO_4,NiSO_4,CoSO_4,NaOH+H_2O$ | $R_4NOH$ |
| Out | $NiSO_4,CoSO_4,NaOH+H_2O$ | $(R_4N)_2CrO_4$ |

The pregnant extractant is stripped and shipped to a remote refinery for further processing in an identical manner to that in "Chromium Recovery". The aqueous solution at a pH of 5 proceeds to the second extraction and is extracted with DEPA dissolved in kerosene with isodecanol as a modifier. The extraction results in cobalt and nickel being extracted and alkali metal salts (e.g., Na), as well as alkaline earth metal salts (e.g., Ca, Mg), being left in the aqueous solution.

| B. Second Extraction | | |
| --- | --- | --- |
| | Aqueous Phase | Extractant Phase |
| In | $NiSO_4,CoSO_4,NaOH + H_2O$ | $(RO)_2PO_2H$ |
| Out | $H_2O + Na_2SO_4$ | $[(RO)_2PO_2]_2Co$ |
| | | $[(RO)_2PO_2]_2Ni$ |

The pregnant DEPA extractant is stripped with sulfuric acid ($H_2SO_4$).

| C. Strip | | |
| --- | --- | --- |
| | Aqueous Phase | Extractant Phase |
| In | $H_2SO_4 + H_2O$ | $[(RO)_2PO_2]_2Co$ |
| | | $[(RO)_2PO_2]_2Ni$ |
| Out | $NiSO_4,CoSO_4,H_2SO_4 + H_2O$ | $(RO)_2PO_2H$ |

The barren extractant phase is recycled to the extraction stage and the $NiSO_4,CoSO_4,H_2SO_4$ aqueous solution is shipped to a remote refinery for the recovery of nickel and cobalt. At the refinery, the aqueous solution is re-extracted with bis(2,4,4-trimethylpentyl) phosphinic acid dissolved in kerosene with isodecanol as a modifier. The extraction takes place at pH of about 5 to 6, preferably at pH of about 5.5, thereby extracting the cobalt and leaving the majority of the nickel behind in the aqueous phase.

| D. First Re-extraction | | |
| --- | --- | --- |
| | Aqueous Phase | Extractant Phase |
| In | $NiSO_4,CoSO_4,H_2SO_4,$ $NH_4OH + H_2O$ | $R_2PO_2H$ |
| Out | $NiSO_4,(NH_4)_2SO_4,$ $H_2SO_4 + H_2O$ | $(R_2PO_2)_2Co$ $(R_2PO_2)_2Ni$ $R_2PO_2NH_4$ |

The aqueous phase proceeds to the second re-extraction stage and the pregnant extractant is scrubbed with cobalt sulfate ($CoSO_4$).

| E. Scrub | | |
| --- | --- | --- |
| | Aqueous Phase | Extractant Phase |
| In | $CoSO_4 + H_2O$ | $(R_2PO_2)_2Co$ |

-continued

| E. Scrub | | |
|---|---|---|
| | Aqueous Phase | Extractant Phase |
| Out | $NiSO_4,(NH_4)_2SO_4,H_2SO_4$ $+ H_2O$ | $(R_2PO_2)_2Ni$ $R_2PO_2NH_4$ $(R_2PO_2)Co$ |

The aqueous phase proceeds to the second re-extraction stage and the pregnant extractant is stripped with sulfuric acid.

| F. Strip | | |
|---|---|---|
| | Aqueous Phase | Extractant Phase |
| In | $H_2SO_4 + H_2O$ | $(R_2PO_2)_2Co$ |
| Out | $CoSO_4 + H_2O$ | $R_2PO_2H$ |

The barren extractant phase is recycled to the first reextraction stage and the cobalt is either recovered from the $CoSO_4$ by crystallization or the $CoSO_4$ converted to cobalt metal by electrowinning. The aqueous phase from the first re-extraction is extracted with bis(2,4,4-trimethylpentyl) phosphinic acid dissolved in kerosene with isodecanol as a modifier but the extraction takes place at pH of about 6.5 to 7.5, preferably pH of about 7.

| G. Second Re-extraction | | |
|---|---|---|
| | Aqueous Phase | Extractant Phase |
| In | $NiSO_4,(NH_4)_2SO_4,$ $NH_4OH,H_2O$ | $R_2PO_2H$ |
| Out | $(NH_4)_2SO_4 + H_2O$ | $(R_2PO_2)_2Ni$ $R_2PO_2NH_4$ |

The aqueous phase is disposed of to the fertilizer industry, for example, or used in the electrowinning of nickel metal. The pregnant extractant is scrubbed with nickel sulfate ($NiSO_4$).

| H. Scrub | | |
|---|---|---|
| | Aqueous Phase | Extractant Phase |
| In | $NiSO_4 + H_2O$ | $(R_2PO_2)_2Ni$ $R_2PO_2NH_4$ |
| Out | $(NH_4)_2SO_4 + H_2O$ | $(R_2PO_2)_2Ni$ |

The aqueous phase is disposed of to the fertilizer industry, for example, or used in the electrowinning of nickel metal. The scrubbed extractant is stripped with sulfuric acid.

| I. Strip | | |
|---|---|---|
| | Aqueous Phase | Extractant Phase |
| In | $H_2SO_4 + H_2O$ | $(R_2PO_2)_2Ni$ |
| Out | $NiSO_4 + H_2O$ | $R_2PO_2H$ |

The extractant phase is recycled to the second reextraction and the nickel is either recovered from the $NiSO_4$ by crystallization or the $NiSO_4$ is converted to nickel metal by electrowinning.

Copper Recovery

An aqueous solution at pH of about 3 to 5, preferably at pH of about 4.5, containing traces of copper salt (ca. 30 ppm Cu) is extracted with DEPA dissolved in kerosene with isodecanol as a modifier.

| A. First Extraction | | |
|---|---|---|
| | Aqueous Phase | Extractant Phase |
| In | $CuSO_4 + H_2O$ | $(RO)_2PO_2H$ |
| Out | $H_2SO_4 + H_2O$ | $[(RO)_2PO_2]_2Cu$ |

The aqueous phase proceeds to the second extraction. The pregnant extractant is stripped with sulfuric acid.

| B. Strip | | |
|---|---|---|
| | Aqueous Phase | Extractant Phase |
| In | $H_2SO_4 + H_2O$ | $[(RO)_2PO_2]_2Cu$ |
| Out | $CuSO_4,H_2SO_4 + H_2O$ | $(RO)_2PO_2H$ |

The extractant phase is recycled to the first extraction and the aqueous phase shipped to a remote refinery for the recovery of copper.

C. Cu Recovery at the Remote Refinery

The copper in the aqueous phase is either recovered from the $CuSO_4$ solution by crystallization and the $H_2SO_4$ recycled to the second extraction, or the $CuSO_4$ is converted to copper metal by electrowinning.

The aqueous solution from the first extraction is extracted with an aliphatic amine extractant ($R_4NOH$) dissolved in kerosene.

| D. Second Extraction | | |
|---|---|---|
| | Aqueous Phase | Extractant Phase |
| In | $H_2O + H_2SO_4$ | $R_4NOH$ |
| Out | $H_2O$ | $(R_4N)_2SO_4$ |

The aqueous phase out is either discharged to drain or recycled to the process. The pregnant extractant is stripped with ammonium hydroxide.

| E. Strip | | |
|---|---|---|
| | Aqueous Phase | Extractant Phase |
| In | $NH_4OH + H_2O$ | $(R_4N)_2SO_4$ |
| Out | $(NH_4)_2SO_4 + H_2O$ | $R_4NOH$ |

The aqueous phase is disposed of to the fertilizer industry, for example, and the barren extractant recycled to the second extraction.

Selective Recovery of Copper, Lead and Nickel

An aqueous solution containing traces of copper, lead and nickel (30 ppm each) at pH of about 4 to 5, preferably pH of about 4.5, is extracted with DEPA dissolved in kerosene with isodecanol as a modifier.

| A. Extraction | | |
|---|---|---|
| | Aqueous Phase | Extractant Phase |
| In | $CuSO_4, NiSO_4, PbSO_4,$ $NaOH + H_2O$ | $(RO)_2PO_2H$ |
| Out | $Na_2SO_4 + H_2O$ | $[(RO)_2PO_2]_2Cu$ $[(RO)_2PO_2]_2Ni$ $[(RO)_2PO_2]_2Pb$ |

The pregnant extractant is stripped with nitric acid ($HNO_3$).

| B. Strip | | |
|---|---|---|
| | Aqueous Phase | Extractant Phase |
| In | $HNO_3 + H_2O$ | $[(RO)_2PO_2]_2Cu$ |
| | | $[(RO)_2PO_2]_2Ni$ |
| | | $[(RO)_2PO_2]_2Pb$ |
| Out | $Cu(NO_3)_2, Ni(NO_3)_2,$ | $(RO)_2PO_2H$ |
| | $Pb(NO_3)_2 + H_2O$ | |

The barren extractant is recycled to extraction and the aqueous phase shipped to a remote refinery for metal cation recovery.

C. Pb Recovery

The pH of the aqueous solution is raised and maintained at about 6 to 8, preferably about 7, while $CO_2$ is bubbled in to precipitate the lead as $PbCO_3$ according to the equation:

$$Cu(NO_3)_2, Ni(NO_3)_2,$$
$$Pb(NO_3)_2 + H_2O + NH_3 + CO_2 \rightarrow Cu(NO_3)_2,$$
$$Ni(NO_3)_2 + H_2O + NH_4NO_3 + PbCO_3$$

The $PbCO_3$ is filtered off and washed and the aqueous solution and wash liquor proceed to the re-extraction where they are re-extracted with bis(2,4,4-trimethylpentyl) phosphinic acid dissolved in kerosene with isodecanol as a modifier.

| D. Re-extraction | | |
|---|---|---|
| | Aqueous Phase | Extractant Phase |
| In | $Cu(NO_3)_2, Ni(NO_3)_2,$ | $R_2PO_2H$ |
| | $NH_4NO_3, NH_4OH + H_2O$ | |
| Out | $NH_4NO_3 + H_2O$ | $[R_2PO_2]_2Ni$ |
| | pH 8 | $[R_2PO_2]_2Cu$ |

The aqueous phase is disposed of to the fertilizer industry, for example. The pregnant extractant is stripped with nitric acid at pH of about 4 to 6, preferably at pH of about 5.

| E. First Strip | | |
|---|---|---|
| | Aqueous Phase | Extractant Phase |
| In | $HNO_3 + H_2O$ | $(R_2PO_2)_2Ni$ |
| Out | $Ni(NO_3)_2 + H_2O$ (pH 5) | $(R_2PO_2)_2Cu$ |

The nickel is recovered from the $Ni(NO_3)_2$ by crystallization. The copper-bearing extractant is stripped with nitric acid at pH of about 1 to 3, preferably at pH of about 1.

| F. Second Strip | | |
|---|---|---|
| | Aqueous Phase | Extractant Phase |
| In | $HNO_3 + H_2O$ | $(R_2PO_2)_2Cu$ |
| Out | $Cu(NO_3)_2, HNO_3 + H_2O$ | $R_2PO_2H$ |
| | (pH 1) | |

The barren extractant is recycled to re-extraction, the copper is recovered from the $Cu(NO_3)_2$ by crystallization and the $HNO_3$ recycled.

The following non-limiting examples further illustrate the invention.

EXAMPLE 1

Two volumes of an aqueous solution of $CuSO_4$ containing 1000 ppm Cu, together with one volume of organic extractant containing 5% w/v di-2-ethylhexylphosphoric acid dissolved in kerosene and modified with 4% v/v isodecanol were agitated for 5 minutes. The phases were allowed to separate, separated and analyzed. Results:

| | Concentration (ppm Cu) | pH |
|---|---|---|
| Aqueous phase | 0.3 | 7.0 |
| Extractant phase | 2,000 | — |

EXAMPLE 2

Example 1 was repeated using the organic extractant from Example 1 and a further 2 volumes of the 1000 ppm Cu, aqueous $CuSO_4$ solution. Results:

| | Concentration (ppm Cu) | pH |
|---|---|---|
| Aqueous phase | 2.5 | 7.0 |
| Extractant phase | 4,000 | — |

EXAMPLE 3

Example 2 was repeated using the organic extractant from Example 2 and a further 2 volumes of the 1000 ppm Cu aqueous $CuSO_4$ solution. Results:

| | Concentration (ppm Cu) | pH |
|---|---|---|
| Aqueous phase | 1.3 | 7.0 |
| Extractant phase | 6,000 | — |

EXAMPLE 4

Example 1 was repeated except that the two phases were manually shaken together, for 15 seconds, in a stoppered separatory funnel. Results:

| | Concentration (ppm Cu) | pH |
|---|---|---|
| Aqueous phase | 0.9 | 7.0 |
| Extractant phase | 2,000 | — |

EXAMPLE 5

Example 4 was repeated using the organic extractant from Example 4 and a further 2 volumes of the 1000 ppm Cu aqueous $CuSO_4$ solution. Results:

| | Concentration (ppm Cu) | pH |
|---|---|---|
| Aqueous phase | 0.7 | 7.0 |
| Extractant phase | 4,000 | — |

EXAMPLE 6

Example 5 was repeated using the organic extractant from Example 5 and a further 2 volumes of the 1000 ppm Cu aqueous $CuSO_4$ solution. Results:

|  | Concentration (ppm Cu) | pH |
|---|---|---|
| Aqueous phase | 1.9 | 7.0 |
| Extractant phase | 6,000 | — |

EXAMPLE 7

Two volumes of the organic extractant used in Example 1 together with one volume of an aqueous solution of $CuSO_4$ containing 27 ppm Cu were manually shaken together for 15 seconds in a stoppered separation funnel. The phases were allowed to separate, separated and analyzed. Results:

|  | Concentration (ppm Cu) | pH |
|---|---|---|
| Aqueous phase | 0.2 | 4.0 |
| Extractant phase | 13.3 | — |

EXAMPLE 8

Example 7 was repeated using one volume of the organic extractant and two volumes of the 27 ppm Cu aqueous $CuSO_4$ solution. Results:

|  | Concentration (ppm Cu) | pH |
|---|---|---|
| Aqueous phase | 0.2 | 4.0 |
| Extractant phase | 52.9 | — |

EXAMPLE 9

Example 7 was repeated using one volume of the organic extractant and four volumes of the 27 ppm Cu aqueous $CuSO_4$ solution. Results:

|  | Concentration (ppm Cu) | pH |
|---|---|---|
| Aqueous phase | 0.4 | 4.0 |
| Extractant phase | 105 | — |

EXAMPLE 10

Example 7 was repeated using one volume of the organic extractant and six volumes of the 27 ppm Cu aqueous $CuSO_4$ solution. Results:

|  | Concentration (ppm Cu) | pH |
|---|---|---|
| Aqueous phase | 0.5 | 4.0 |
| Extractant phase | 157 | — |

EXAMPLE 11

Example 7 was repeated using one volume of the organic extractant and six volumes of an aqueous $CuSO_4$ solution containing 60 ppm Cu. Results:

|  | Concentration (ppm Cu) | pH |
|---|---|---|
| Aqueous phase | 0.8 | 4.0 |
| Extractant phase | 355 | — |

EXAMPLE 12

Example 7 was repeated using one volume of the organic extractant and six volumes of an aqueous $CuSO_4$ solution containing 90 ppm Cu. Results:

|  | Concentration (ppm Cu) | pH |
|---|---|---|
| Aqueous phase | 1.3 | 4.0 |
| Extractant phase | 532 | — |

The following table summarizes the results of additional tests carried out on a continuous, countercurrent centrifugal extractor. In all tests, the combined flow rates were 1200 milliliters per minute:

| Test | Aqueous to Extractant Flow Rates Ratio | Time (mins.) | Concentration (ppm Cu) Aqueous Feed | Aqueous Raffinate | Extractant | pH | Extractant |
|---|---|---|---|---|---|---|---|
| 1 | 2 | 5 |  | 0.2 | 59.6 |  | 5% w/v DEPA |
|  |  | 10 | 30 | 0.2 | 59.6 | 3.5 | dissolved in |
|  |  | 20 |  | 0.3 | 59.4 |  | kerosene and modified with 4% v/v isodecanol |
| 2 | 0.5 | 5 | 30 | 0.48 | 14.8 | 3.0 | same as test 1 |
|  |  | 10 |  | 0.86 | 14.6 |  |  |
|  | 2 | 5 |  | 0.31 | 59.4 |  |  |
|  |  | 10 |  | 0.51 | 59.0 |  |  |
|  |  | 15 |  | 0.47 | 59.1 |  |  |
|  | 4 | 5 |  | 0.28 | 118.9 |  |  |
|  |  | 10 |  | 0.46 | 118.2 |  |  |
|  |  | 15 |  | 0.45 | 118.2 |  |  |
|  | 6 | 5 |  | 0.32 | 178.1 |  |  |
|  |  | 10 |  | 0.40 | 177.6 |  |  |
|  |  | 15 |  | 0.44 | 177.4 |  |  |
|  | 8 | 5 |  | 0.31 | 237.5 |  |  |
|  |  | 10 |  | 0.32 | 237.4 |  |  |

EXAMPLE 13

Five volumes of an aqueous solution of $(NH_4)_2CrO_4$ containing 9 ppm of hexavalent chromium together with one volume of organic extractant containing 5% w/v of monomethyl trialkyl ($C_{8-18}$) quaternary in the hydroxide form dissolved in kerosene and modified with 4% v/v isodecanol were manually shaken together, for 1 minute, in a stoppered separatory funnel. The phases were allowed to separate and analyzed. This procedure was repeated using aqueous solutions of varying hexavalent chromium content. Results:

| Feed Solution | Extraction Products | | |
|---|---|---|---|
| | Aqueous Phase | | Organic Phase |
| (ppm Cr$^6$) | (ppm Cr$^6$) | (pH) | (ppm Cr$^6$) |
| 9 | 0.16 | 7.0 | 45 |
| 23 | 0.09 | 7.0 | 113 |
| 45 | 0.08 | 7.0 | 226 |
| 68 | 0.48 | 7.0 | 338 |

EXAMPLE 14

Five volumes of an aqueous solution of Ni(NO$_3$)$_2$ containing 8 ppm of Ni together with one volume of organic extractant containing 5% w/v di-2-ethylhexylphosphoric acid dissolved in kerosene and modified with 4% v/v isodecanol were manually shaken together for 1 minute in a stoppered separatory funnel. The phases were allowed to separate and analyzed. This procedure was repeated using aqueous solutions of varying Ni content. Results:

| Feed Solution | Extraction Products | | |
|---|---|---|---|
| | Aqueous Phase | | Organic Phase |
| (ppm Ni) | (ppm Ni) | (pH) | (ppm Ni) |
| 8 | 0.02 | 7.0 | 42 |
| 21 | 0.33 | 7.0 | 103 |
| 42 | 0.33 | 7.0 | 208 |
| 63 | 5.08 | 7.0 | 290 |

EXAMPLE 15

Five volumes of an aqueous solution of Pb(NO$_3$)$_2$ was extracted as in Example 14. Results:

| Feed Solution | Extraction Products | | |
|---|---|---|---|
| | Aqueous Phase | | Organic Phase |
| (ppm Pb) | (ppm Pb) | (pH) | (ppm Pb) |
| 7 | 0.13 | 7.0 | 36 |
| 19 | 0.25 | 7.0 | 91 |
| 37 | 1.48 | 7.0 | 178 |
| 56 | 12.11 | 7.0 | 217 |

EXAMPLE 16

Five volumes of an aqueous solution of Co(NO$_3$)$_2$ were extracted as in Example 14. Results:

| Feed Solution | Extraction Products | | |
|---|---|---|---|
| | Aqueous Phase | | Organic Phase |
| (ppm Co) | (ppm Co) | (pH) | (ppm Co) |
| 25 | 1.35 | 7.0 | 116 |
| 49 | 2.97 | 7.0 | 230 |
| 74 | 12.05 | 7.0 | 307 |

Whereas the exact scope of the instant invention is set forth in the appended claims, the following specific examples illustrate certain aspects of the present invention. However, the examples are set forth for illustration only and are not to be construed as limitations on the present invention except as set forth in the appended claims.

What is claimed is:

1. A process for the selective recovery of hexavalent chromium, cobalt and nickel from an aqueous solution comprising extracting said aqueous solution with an aliphatic amine first extractant to extract hexavalent chromium into the first extractant to form a first pregnant extractant and a barren aqueous solution, stripping the first pregnant extractant with a first alkali metal or ammonium aqueous strip solution to strip hexavalent chromium into the first aqueous strip solution from the first pregnant extractant to form a first barren extractant and a first pregnant strip solution, treating said first pregnant strip solution to recover chromium therefrom, extracting the barren aqueous solution from the first extraction with di-2-ethylhexyl phosphoric acid second extractant so that cobalt and nickel are extracted from the barren aqueous solution to form a second pregnant extractant, stripping the second pregnant extractant with a second mineral acid aqueous strip solution to form a second barren extractant and a second pregnant strip solution, recycling the second barren extractant to the second extraction, re-extracting the second pregnant strip solution at pH of about 5 to 6 with an organophosphinic acid first re-extractant to extract cobalt into the first re-extractant to form a first pregnant re-extractant and a first barren strip solution, scrubbing the first pregnant re-extractant with cobalt sulfate, stripping the scrubbed first pregnant re-extractant with a third mineral acid aqueous strip solution to recover cobalt, re-extracting the first barren strip solution from the first re-extraction at pH of about 6.5 to 7.5 with an organophosphinic acid second re-extractant to extract nickel into the second re-extractant to form a second pregnant re-extractant, scrubbing the second pregnant re-extractant with nickel sulfate, and stripping the scrubbed second pregnant re-extractant with a fourth mineral acid aqueous strip solution to recover nickel.

2. The process of claim 1 wherein the aliphatic amine first extractant is a primary, secondary or tertiary alkyl amine.

3. The process of claim 1 wherein the aliphatic amine first extractant is trioctyl methyl ammonium hydroxide or tridecyl methyl ammonium hydroxide.

4. The process of claim 1 wherein the organophosphinic acid first and second re-extractants are represented by the following formula:

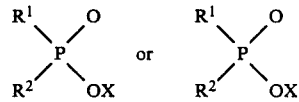

wherein R$_1$ and R$_2$ are individually substituted or unsubstituted alkyl, cycloalkyl, alkoxyalkyl, alkylcyclo alkyl, aryl, alkylaryl, aralkyl or cycloalkylaryl radicals and X is either hydrogen or a salt-forming radical.

5. The process of claim 1 wherein the organophosphinic acid first and second re-extractants are bis (2,4,4-trimethylpentyl) phosphinic acid.

6. The process of claim 1 wherein the extractants and re-extractants contain from about 1 to 15 parts by volume of a phase modifier to promote the separation of the phases or increase the solubility of the extracted metal cation.

7. The process of claim 6 wherein the phase modifier is tributylphosphate, trimethylphosphine oxide, tributylphosphine oxide, trihexyl phosphine oxide, trioctylphosphine oxide, or isodecanol.

8. The process of claim 1 wherein the mineral acid in the second, third and fourth aqueous strip solutions is sulfuric, hydrochloric, hydrofluoric or nitric acid.

9. The process of claim 1 wherein said aqueous solution has a metal concentration of from about 1 to 200 p.p.m.

10. The process of claim 1 wherein said aqueous solution has a pH of about 2 to 8.

* * * * *